United States Patent
Scholl

(10) Patent No.: US 6,174,951 B1
(45) Date of Patent: Jan. 16, 2001

(54) SURFACE-MODIFIED, OXIDIC OR SILICATED FILLING MATERIALS AND THE USE THEREOF

(75) Inventor: Thomas Scholl, Bergisch Gladbach (DE)

(73) Assignee: Bayer Aktiengesellschaft, Leverkusen (DE)

( * ) Notice: Under 35 U.S.C. 154(b), the term of this patent shall be extended for 0 days.

(21) Appl. No.: 09/403,404

(22) PCT Filed: Apr. 14, 1998

(86) PCT No.: PCT/EP98/02177

§ 371 Date: Oct. 20, 1999

§ 102(e) Date: Oct. 20, 1999

(87) PCT Pub. No.: WO98/47955

PCT Pub. Date: Oct. 29, 1998

(30) Foreign Application Priority Data

Apr. 22, 1997 (DE) ............................................. 197 17 091

(51) Int. Cl.⁷ ..................................................... C08K 3/00
(52) U.S. Cl. ........................... 524/492; 524/493; 523/216
(58) Field of Search .................................. 524/492, 493; 523/216

(56) References Cited

U.S. PATENT DOCUMENTS

| 2,736,669 | * | 2/1956 | Goebel | 117/54 |
| 2,801,185 | * | 7/1957 | Iler | 106/288 |
| 3,842,111 | * | 10/1974 | Meyer-Simon et al. | 260/448.2 E |
| 3,978,103 | * | 8/1976 | Meyer-Simon et al. | 260/448.8 R |
| 3,997,356 | * | 12/1976 | Thurn et al. | 106/288 Q |
| 4,076,550 | * | 2/1978 | Thurn et al. | 106/288 Q |
| 4,514,231 | * | 4/1985 | Kerner et al. | 106/309 |
| 4,704,414 | * | 11/1987 | Kerner et al. | 523/213 |
| 5,409,969 | * | 4/1995 | Hamada | 523/213 |
| 5,496,883 | * | 3/1996 | Hamada | 524/492 |

* cited by examiner

Primary Examiner—Edward J. Cain
(74) Attorney, Agent, or Firm—Joseph C. Gil; Noland J. Cheung

(57) ABSTRACT

Surface-treated oxide or siliceous fillers are prepared by esterification of an oxide or siliceous filler with unsaturated compounds containing hydroxyl groups and treatment with sulfur or with sulfur donor, the reactions being carried out either in succession or together.

The rubber mixtures obtained using these modified fillers are suitable for the production of highly reinforced, abrasion-resistant moldings, in particular for the production of tires having a low rolling resistance and high abrasion resistance.

8 Claims, No Drawings

SURFACE-MODIFIED, OXIDIC OR SILICATED FILLING MATERIALS AND THE USE THEREOF

FIELD OF THE INVENTION

The present invention relates to new surface-modified oxide or siliceous fillers and their use for the preparation of rubber mixtures and of rubber vulcanisates. The rubber mixtures obtained by using these modified fillers are suitable for the production of highly reinforced, abrasion-resistant mouldings, in particular for the production of tires having a low rolling resistance and a high abrasion resistance.

BACKGROUND OF THE INVENTION

The treatment of the surfaces of fillers in order to improve the filler/matrix coupling in thermoplastic and thermosetting composites and in filled rubber systems is known. Thus U.S. Pat. Nos. 4,514,231 and 4,704,414 describe the treatment of fillers with polysulfide silyl ethers having the structure $(R_n{}^1(RO)_{3-n}Si—(Alk)_m—Ar)_p)_2(S)_x$, in particular bis(triethoxysilylpropyl) tetrasulfide. According to DE 2 141 159 and 2 255 577, the addition of the same polysulfide silyl ethers to the mixture of rubber and untreated filler ("in situ surface modification") is also appropriate for the production of highly reinforced and abrasion-resistant rubber articles. A disadvantage of the use of polysulfide silyl ethers for improving the filler/matrix coupling is its expensive production process and the high raw-material costs associated therewith.

U.S. Pat. Nos. 2,736,669 and 2,801,185 describe a process for hydrophobing silicas which is based on the treatment of silicas with alcohols at particular temperatures. But the silica treated in this way does not show an improved reinforcing effect in a rubber matrix.

SUMMARY OF THE INVENTION

It has now been found that the esterification of oxide and siliceous fillers with unsaturated compounds containing hydroxyl groups and treatment with sulfur and/or with a sulfur donor leads to effective new fillers, the advantages of which lie on the one hand in the considerably decreased raw-material costs compared with those of the silica/silane system and on the other hand in the distinctly improved rheological behaviour of the rubber mixture (low viscosity of the mixture, little swelling after extrusion), the distinctly more favourable dynamic hysteresis properties (low heat build-up, low rolling resistance) of the rubber vulcanisates prepared by this means as well as the improved ageing performance of the vulcanisates under thermal and dynamic stress (reversion resistance) associated with a high abrasion resistance.

DETAILED DESCRIPTION OF THE INVENTION

The present invention therefore provides surface-treated oxide or siliceous fillers, prepared by esterification of an oxide or siliceous filler with from 0.1 to 50 parts by weight of an unsaturated compound containing hydroxyl groups and treatment with from 0.1 to 50 parts by weight sulfur (each based on 100 parts by weight of filler used) or sulfur donor, the two procedures being carried out either in succession or together.

Here the reaction temperatures for the esterification of the unsaturated compounds containing hydroxyl groups with the oxide or siliceous filler are from room temperature (25° C.) up to the decomposition temperature of the compound containing hydroxyl groups, preferably from 50° C. to 250° C., and the temperature for the treatment of the sulfur is from room temperature up to 250° C., preferably from 120° C. to 200° C.

The reactions may be carried out without solvents or in a solvent, optionally with the application of a vacuum or of a pressure of 1 to 100 atm and also in the presence of additional vulcanising chemicals, such as accelerators, retarders, antioxidants, plasticisers and other cross-linking agents for rubber.

The surface-treated oxide and siliceous fillers according to the invention are powders which have been rendered partially or completely hydrophobic and whose values for wettability by methanol are 0 to 55%. In this connection, the wettability by methanol states the minimal proportion of methanol (in per cent by weight) in a methanol/water mixture which is capable of wetting the filler. The method for determining the wettability by methanol is described in the experimental section of the present patent application.

By oxide and siliceous fillers are meant all known naturally occurring or synthetic inorganic fillers which, by reason of containing hydroxyl groups or oxide groups, can undergo a surface reaction with the unsaturated compounds containing hydroxyl groups, with the elimination of water. Examples of these include precipitated or pyrogenic silica, aluminium hydroxide, aluminium silicate, calcium silicate, calcium sulfate, china clay or calcined clay.

The following are particularly preferred:

highly disperse silicas, prepared, for example, by precipitation of solutions of silicates or by flame hydrolysis of silicon halides having specific surfaces of 5 to 1000 $m^2/g$, preferably 20 to 400 $m^2/g$ (BET surface area) and primary particle sizes of 10 to 400 nm. The silicas may optionally also be present as mixed oxides together with other metal oxides, such as the oxides of Al, Mg, Ca, Ba, Zn, Zr and Ti.

synthetic silicates, such as aluminium silicate, alkaline-earth silicates such as magnesium silicate or calcium silicate, having BET surface areas of 20 to 400 $m^2/g$ and primary particle diameters of 10 to 400 nm natural silicates, such as kaolin and other naturally-occurring silicas glass fibres and glass fibre products (mats, strands) or glass microbeads.

metal oxides, such as zinc oxide, calcium oxide, magnesium oxide, aluminium oxide metal carbonates, such as magnesium carbonate, calcium carbonate, zinc carbonate metal hydroxides such as, for example, aluminium hydroxide, magnesium hydroxide.

The molecular weight of the unsaturated compounds containing hydroxyl groups has an effect on the technical process of carrying out the reaction with the fillers. Thus in the case of volatile, low-molecular unsaturated compounds containing hydroxyl groups, precautionary measures have to be taken, for example, the application of a pressure of 1 to 100 atm, to ensure that they do not escape at the high reaction temperatures, whereas in the case of highly polymeric unsaturated compounds containing hydroxyl groups, the high viscosity necessitates the use of solvents or introduction in the form of aqueous latex. The unsaturated compounds containing hydroxyl groups may therefore be of low molecular weight or polymeric and have molecular weights of from 58 (alkyl alcohol) up to 500,000. Molecular weights of 150 to 10,000 are preferred. Unsaturated compounds containing hydroxyl groups and having molecular weights of 200 to 5000 are most particularly preferred.

The hydroxyl group content of the compounds is so calculated that there is at least one hydroxyl group in the molecule, preferably 0.1 to 15 hydroxyl groups per 1000 atomic mass units, and OH values of 4 to 800. Compounds having OH values of 4 to 400 are particularly preferred. The OH value, as defined in DIN 53 240, gives the number of mg of KOH equivalent to the quantity of acetic acid which is chemically bound by 1 g of substance on acetylation. Primary and secondary hydroxyl groups are preferred to tertiary bonded hydroxyl groups.

The number of double bonds in the compounds is so calculated that there is at least one double bond in the molecule, preferably 0.2 to 18 double bonds per 1000 molecular weight units, corresponding to iodine values of 5 to 470. Particularly preferred iodine values are within the range of 35 to 470. The iodine values are generally determined by the addition of iodine chloride in acetic acid according to Wijs, DIN 53 241, Part 1. The iodine value defines the quantity of iodine in grams which is chemically bound by 100 g of substance.

Besides the hydroxyl groups, the compounds may contain additional functional groups, for example, carboxylic acid and metal salts thereof, carboxylic esters, carboxylic acid amide, sulfonic acid and metal salts thereof, sulfonic esters and sulfo groups, amino groups, phosphoric acid groups and phosphorous acid and esters thereof, silyl ethers and halogen atoms. The effect of the surface-modified oxide and siliceous fillers can be further improved by suitable selection of these additional functional groups. Preferred additional substituents are carboxylic acid groups and salts thereof and carboxylic ester groups.

Particularly preferred unsaturated compounds containing hydroxyl groups are allyl alcohol, propargyl alcohol, 1,4-butenediol, 2-methylene-1,3-propanediol, 2-hexen-1-ol, 5-hexene-1,2-diol, 1,5-hexadiene-3,4-diol, 3-cyclohexene-1,1-dimethanol, 1-octen-3-ol, 10-undecen-1-ol (undecylenyl alcohol), dodecyl alcohol, hexadecenol, oleyl alcohol, ricinoleic acid, cinnamyl alcohol, castor oil, hydroxyethyl (meth)acrylate, 4-hydroxybutyl (meth)acrylate, polybutadiene oil containing hydroxyl groups having preferred OH values of 20 to 200 (Poly BD Resins from the firm Elf Atochem or Hycar HT from the firm B.F. Goodrich), unsaturated polyesters containing hydroxyl groups and having average molecular weights of 1000 to 20,000, unsaturated polyethers containing hydroxyl groups, such as addition products obtained from 1 to 200 mol ethylene oxide and/or propylene oxide per mol of unsaturated alcohol.

Products are prepared preferably from 0.1 to 50 parts by weight, particularly preferably 5 to 25 parts by weight, of unsaturated compound containing hydroxyl groups per 100 parts by weight of oxide or siliceous filler.

The unsaturated compounds containing hydroxyl groups may be used on their own or in a mixture or may be used even in a mixture with saturated or unsaturated compounds free from hydroxyl groups, which then optionally do not take part in the subsequent reaction with sulfur or with a sulfur donor and are merely physically bound to the filler. Examples of the latter are silicone oils, paraffin oils and mineral oils.

The reaction of the fillers with the compounds containing hydroxyl groups may be carried out without solvents or in organic solvents or in a vacuum at temperatures from above room temperature up to below the decomposition temperature of the compound containing hydroxyl groups. To carry out the esterification at temperatures below 100° C., a previous heat treatment of the oxide or siliceous filler at temperatures of 300° C. to 800° C., as described in U.S. Pat. No. 2,736,669, is recommended. Otherwise temperatures from 100° C. to below the decomposition temperature of the compound containing hydroxyl groups are preferred. The oxide or siliceous fillers may also be introduced as products moistened by water or even as a suspension in water. The residual moisture is removed from the reaction product together with the water formed during the reaction. The water of reaction is advantageously removed either immediately, while the reaction is in progress, or in a subsequent drying step. The completion of esterification can be detected, for example, by the fact that the compound containing hydroxyl groups can no longer be extracted with suitable solvents.

Examples of suitable solvents for carrying out the surface modification are saturated or unsaturated aliphatic or aromatic hydrocarbons chlorinated aliphatic or chlorinated aromatic hydrocarbons as well as alcohols.

The treatment with sulfur or with a sulfur donor may be carried out either at the same time as the reaction between filler and unsaturated compound containing hydroxyl groups or in a subsequent reaction step. It is preferable to carry out a subsequent reaction step in order to ensure that the condensation reaction in the first reaction step proceeds to completion. The treatment with sulfur or with sulfur donor can be carried out by simple physical mixing of the components with the esterified filler or, preferably, by mixing and subsequent chemical reaction. The term sulfur donor means substances which, under the vulcanisation conditions, result in addition products of sulfur and the unsaturated component. Examples of suitable sulfur donors are dithiodimorpholine, dithiodicaprolactam, bis (dioctyldithiophosphoric acid) tetrasulfide or even disulfur dichloride. Preferred quantities of sulfur or sulfur donors are from 0.1 to 20 parts by weight, based on 100 parts by weight of oxide or siliceous filler; the use of 0.5 to 10 parts by weight of sulfur or sulfur donors per 100 parts by weight of filler is particularly preferred. The mixing or reaction temperatures are from room temperature up to 250° C., preferably from 100° C. to 200° C. The mixing or reaction times may be from a few minutes up to several hours. Moreover, other conventional vulcanising chemicals and vulcanisation assistants, in particular zinc oxide or zinc salts of aliphatic or aromatic carboxylic acids, can be added. Examples of suitable vulcanisation accelerators are mercaptobenzothiazole, mercaptobenzothiazolesulfenamides such as, for example, the corresponding N-tert. butyl-, N-cyclohexyl-, N,N-dicyclohexylsulfenamides, dithiodibenzothiazole, guanidines such as, for example, diphenylguanidine and di-o-tolylguanidine, thiurams such as, for example, tetrabenzylthiuram disulfide, dithiocarbamates such as, for example, zinc dibenzyldithiocarbamate, thioureas such as, for example, diphenylthiourea, thiocarbonates and peroxides. An example of a suitable vulcanisation retarder is N-cyclohexylthiophthalimide. Silicon-containing filler activators such as, for example, bis (triethoxysilylpropyl) tetrasulfide, thiocyanatopropyltriethoxysilane (DE-OS 19 544 469) or those described in EP 466 066, can also be added. The preferred quantities of each of these additional vulcanisation assistants are from 0.1 to 300 parts by weight per 100 parts by weight of sulfur or sulfur donor. Quantities of from 0.1 to 25 parts by weight per 100 parts by weight of sulfur are preferred.

Besides natural rubber, synthetic rubbers are also suitable for the preparation of rubber vulcanisates with the aid of the surface-modified fillers. Synthetic rubbers are described, for example, in: W. Hofmann, Kautschuktechnologie, Gentner Verlag, Stuttgart, 1980. They include the following:

BR—polybutadiene

ABR—butadiene-acrylic acid-$C_{1-4}$-alkyl ester copolymers

CR—polychloroprene

IR—polyisoprene

SBR—styrene-butadiene copolymers having styrene contents of 1 to 6 wt. %, preferably 20 to 50 wt. %

IIR—isobutylene-isoprene copolymers

NBR—butadiene-acrylonitrile copolymers having acrylonitrile contents of 5 to 60 wt. %, preferably 10 to 40 wt. %

HNBR—partly hydrogenated or completely hydrogenated NBR rubber

EPDM—ethylene-propylene-diene copolymers as well as mixtures of these rubbers. Rubbers which are of interest for the production of automobile tires with the aid of the surface-modified fillers are in particular natural rubber, emulsion SBR and solution SBR rubbers having a glass temperature of above—50° C., which optionally may be modified with silyl ethers or other functional groups as described, for example, in EP-A 447 066, polybutadiene rubbers having a high 1,4-cis content (>90%), which are prepared using catalysts based on Ni, Co, Ti or Nd, as well as polybutadiene rubber having a vinyl content of 0 to 75% and mixtures thereof.

The rubber mixtures may contain other fillers in addition to the surface-modified oxide and siliceous fillers according to the invention. These other fillers are untreated oxide and siliceous fillers as well as carbon blacks. Preferred additional fillers are, for example:

highly disperse silicas prepared, for example, by precipitation of solutions of silicates or by flame hydrolysis of silicon halides having specific surfaces of 5 to 1000 $m^2/g$, preferably 20 to 400 $m^2/g$ (BET surface area) and primary particle sizes of from 10 to 400 nm. The silicas may optionally also be present as mixed oxides together with other metal oxides such as the oxides of Al, Mg, Ca, Ba, Zn, Zr, Ti, synthetic silicates such as aluminium silicate or alkaline earth silicates such as magnesium silicate or calcium silicate, having BET surface areas of from 20 to 400 $m^2/g$ and primary particle diameters of from 10 to 400 nm, natural silicates, such as kaolin and other naturally-occurring silicas, glass fibres and glass fibre products (mats, strands) or glass microbeads, metal oxides, such as zinc oxide, calcium oxide, magnesium oxide, aluminium oxide, metal carbonates, such as magnesium carbonate, calcium carbonate, zinc carbonate, metal hydroxides such as, for example, aluminium hydroxide, magnesium hydroxide, carbon blacks. The carbon blacks to be used here are produced by the lampblack, furnace black or channel processes and have BET surface areas of 20 to 200 $m^2/g$, such as, for example, SAF, ISAF, HAF, FEF or GPF carbon blacks.

Highly disperse precipitated silicas and carbon blacks are particularly preferred. The above-mentioned fillers can be used alone or in a mixture.

The rubber mixtures according to the invention may contain additional rubber auxiliaries, such as reaction accelerators, antioxidants, heat stabilisers, light stabilisers, antiozonants, processing agents, plasticisers, tackifiers, blowing agents, dyes, pigments, waxes, extenders, organic acids, retarders, metal oxides as well as activators such as triethanolamine, polyethylene glycol, hexanetriol, bis (triethoxysilylpropyl) tetrasulfide, thiocyanatopropyltriethoxysilane or those described in EP 466 066, which are known in the rubber industry.

The rubber auxiliaries are used in conventional quantities, which depend on the intended use and on other factors. Conventional quantities are, for example, quantities of from 0.1 to 50 wt. %, based on the rubber.

Because they contain bound sulfur, the surface-treated oxide and siliceous fillers according to the invention may also be used on their own in the vulcanisation as cross-linking agents.

Other known cross-linking agents which may be used are sulfur, sulfur donors or peroxides. The rubber mixtures according to the invention may moreover contain vulcanisation accelerators. Examples of suitable vulcanisation accelerators are mercaptobenzothiazoles, mercaptosulfenamides, guanidines, thiurams, dithiocarbamates, thioureas and thiocarbonates. The cross-linking accelerators and sulfur or peroxides are used in quantities of from 0.1 to 10 wt. %, preferably 0.1 to 5 wt. %, based on the rubber.

The vulcanisation can be carried out at temperatures of 100° C. to 200° C., preferably 130° C. to 180° C., optionally under a pressure of 10 to 200 bar.

The mixing of the rubbers with the surface-modified fillers can be carried out in conventional mixing units such as rolls, closed mixers and mixer-extruders.

The rubber vulcanisates according to the invention are suitable for the production of moulded articles, for example, for the manufacture of cable sheaths, tubing, drive belts, conveyor belts, roller coatings, tires, shoe soles, sealing rings and damping elements.

EXPERIMENTAL SECTION

Determination of the Wettability by Methanol

The wettability by methanol states the minimal proportion of methanol (in per cent by weight) in a methano/water mixture which is capable of wetting the filler. 50 ml water was placed in a 250 ml flask equipped with magnetic stirrer and stirred rapidly (700 rpm). 200 mg hydrophobic silica was added thereto. The tip of a measuring pipette filled with methanol was then dipped into the liquid phase (in order to avoid a direct contact with the silica) and the methanol was allowed to flow in slowly. Portions of methanol, each of 2 ml, were added at intervals of 1 minute until the solid substance was wetted, that is, silica no longer floated on the surface. Evaluation: the data for the wettability by methanol is given in wt. % methanol of the methanol/water mixture in accordance with the formula.

Wettability by methanol (in wt. %)=(0.79×number of ml MeOH)/0.79×number of ml MeOH+50)×100.

EXAMPLE 1

Silica Surface-treated with Oleyl Alcohol and Sulfur a) Reaction of silica with oleyl alcohol 600 g Vulkasil S (highly active precipitated silica having a BET surface area of 180 $m^2/g$ from Bayer AG) and 120 g oleyl alcohol were heated at 220–240° C. (oil bath temperature) for 4 hours, with stirring, in the course of which 40.5 g water was distilled off. 668 g of a white powder was obtained.

By Soxhlet extraction with boiling toluene, from 20 g of the product it was possible to recover 0.44 g of a light-coloured oil, corresponding to 11% of the oleyl alcohol used.

b) Reaction with sulfur 400 g of the product from reaction step 1 was mixed with 26.6 g sulfur and heated at 150° C. for 5 hours, with stirring. 425 g of a grey powder was obtained.

Wettability by methanol: 40%.

EXAMPLE 2

Silica Surface-treated with Castor Oil and Sulfur 400 g Vulkasil S (highly active precipitated silica having a BET surface area of 180 $m^2/g$ from Bayer AG) and 80 g castor oil were heated at 220–240° C. (oil bath temperature) for 2.5 hours, with stirring, in the course of which 30 g water was distilled off. 25 g sulfur was then added thereto and the mixture was heated at 150° C. for a further 7 hours. 472 g of a colourless powder was obtained.

Wettability by methanol: 21%.

EXAMPLE 3

As described in Example 1, 440 g Vulkasil S was first of all reacted with 44 g oleyl alcohol and then the entire reaction product was reacted with 17.6 g sulfur. 477 g of a light-coloured powder was obtained.

Wettability by methanol: 26%.

EXAMPLE 4

Silica Surface-treated with Polybutadiene Oil and Sulfur 400 g Vulkasil S (highly active precipitated silica having a BET surface area of 180 $m^2/g$ from Bayer AG) and 80 g of hydroxyl-terminated polybutadiene oil having an average molecular weight of 1220 and the OH value 95 (Poly BD R 20 LM from Atochem) were heated at 200° C. for 4 hours, with stirring, in the course of which 25 g water was distilled off. 25 g sulfur was then added thereto and the mixture was heated at 150° C. for a further 5 hours. 475 g of a colourless powder was obtained.

Wettability by methanol: 20%.

EXAMPLE 5

Silica Surface-treated with Oleyl Alcohol and Sulfur in the Presence of ZnO and Accelerator 440 g Vulkasil S (highly active precipitated silica having a BET surface area of 180 $m^2/g$ from Bayer AG) and 44 g oleyl alcohol were heated at 220° C. (oil bath temperature) for 5 hours, in the course of which 25 g water was distilled off. 13.8 g sulfur, 5.5 g ZnO and 2.75 g N-cyclohexylmercaptobenzothiazolesulfenamide were then added and the mixture was heated at 150° C. for 5 hours, with stirring.

496 g of a colourless powder was obtained.

EXAMPLE 6

500 g Vulkasil S (highly active precipitated silica having a BET surface area of 180 $m^2/g$) and 60 g oleyl alcohol were mixed together at room temperature and heated, with stirring, in an oil bath at a bath temperature of 220° C. Approximately 33 ml water was distilled off over a period of 4 ½ hours. Then 2.5 g diphenylguanidine (Vulkacit D) was added, with stirring, at a bath temperature of 170–180° C.; after the mixture had been cooled to approximately 40° C., 25 g sulfur powder was added thereto and the whole was stirred intensively for 30 minutes at room temperature. 554 g of modified silica was obtained in the form of a colourless powder.

EXAMPLE 7

500 g Vulkasil S (highly active precipitated silica having a BET surface area of 180 $m^2/g$) and 50 g oleyl alcohol were mixed together at room temperature and heated, with stirring, in an oil bath at a bath temperature of 210–220° C. Approximately 30 ml water was distilled off over a period of 4 ½ hours. Then 5 g bis(triethoxysilylpropyl) tetrasulfide (Si 69, Degussa AG) and 25 g sulfur powder were added thereto, with stirring, at a bath temperature of 130° C. and stirring was continued for 5 hours at a temperature of 150° C. 550 g of modified silica was obtained in the form of a colourless powder.

Wettability by methanol: 32%.

EXAMPLE 8

The following rubber mixtures were prepared at 130° C. in a 1.5 l kneader. Sulfur and accelerators were finally added thereto on a roll at 50° C.

|  | Comparison Example | | | Examples according to the invention | | | |
| --- | --- | --- | --- | --- | --- | --- | --- |
|  | A | B | C | D | E | F | G |
| Solution SBR rubber Buna VSL 4020-0 (Bayer AG) | 75 | 75 | 75 | 75 | 75 | 75 | 75 |
| BR rubber Buna CB 11 (Bayer AG) | 25 | 25 | 0 | 25 | 25 | 0 | 0 |
| BR rubber Buna CB 24 (Bayer AG) | 0 | 0 | 25 | 0 | 0 | 25 | 25 |
| Silica Vulkasil S (Bayer AG) | 80 | 0 | 80 | 0 | 0 | 0 | 0 |
| Silica without sulfur treatment as in Ex. 1a | 0 | 80 | 0 | 0 | 0 | 0 | 0 |
| Silica as in Example 1 | 0 | 0 | 0 | 80 | 0 | 0 | 0 |
| Silica as in Example 2 | 0 | 0 | 0 | 0 | 80 | 0 | 0 |
| Silica as in Example 3 | 0 | 0 | 0 | 0 | 0 | 80 | 0 |
| Silica as in Example 4 | 0 | 0 | 0 | 0 | 0 | 0 | 80 |
| Carbon black Corax 339 (Degussa) | 6.5 | 6.5 | 6.5 | 6.5 | 6.5 | 6.5 | 6.5 |
| Aromatic oil | 32.5 | 32.5 | 32.5 | 32.5 | 32.5 | 32.5 | 32.5 |
| Zinc oxide | 2.5 | 2.5 | 2.5 | 2.5 | 2.5 | 2.5 | 2.5 |
| Stearic acid | 1 | 1 | 1 | 1 | 1 | 1 | 1 |
| Antioxidant Vulkanox 4020 (Bayer AG) | 1 | 1 | 1 | 1 | 1 | 1 | 1 |
| Antiozonant wax Antilux 654 (Rhein Chemie) | 1.5 | 1.5 | 1.5 | 1.5 | 1.5 | 1.5 | 1.5 |
| Silane Si 69 (Degussa) | 6.5 | 0 | 6.5 | 0 | 0 | 0 | 0 |
| Sulfur | 1.5 | 1.5 | 1.5 | 1.5 | 1.5 | 1.5 | 1.5 |
| Accelerator Vulkacit CZ (Bayer AG) | 1.5 | 1.5 | 1.5 | 1.5 | 1.5 | 1.5 | 1.5 |
| Accelerator Vulkacit D (Bayer AG) | 2 | 2 | 2 | 2 | 2 | 2 | 2 |

|  | Comparison Example | | | Examples according to the invention | | | |
|---|---|---|---|---|---|---|---|
|  | A | B | C | D | E | F | G |
| Viscosity of mixture ML 1 + 4 (100° C.) | 75 | 48 | 67 | 45 | 58 | 64 | 70 |
| Mooney Relaxation 30 s (%) | 15 | 8 | 12 | 8 | 5 | 8 | 8 |
| The rubber mixtures were then vulcanised for 30 minutes at 160° C. The following vulcanisation properties were found: | | | | | | | |
| Tensile stress at 100% elongation (MPa) | 2.7 | 0.9 | 3.2 | 3.2 | 4 | 3.9 | 3 |
| Tensile stress at 300% elongation (MPa) | 9.6 | 2.0 | 11.2 | 8.2 | 8.9 | 10.6 | 7.9 |
| Strain at break (%) | 447 | 919 | 450 | 489 | 430 | 440 | 590 |
| Shore A hardness at 23° C. | 72 | 46 | 71 | 66 | 73 | 74 | 71 |
| Shore A hardness at 70° C. | 70 | 43 | 69 | 65 | 69 | 71 | 69 |
| Rebound elasticity (%) at 23° C. | 33 | 34 | 34 | 39 | 34 | 37 | 35 |
| Rebound elasticity (%) at 70° C. | 45 | 41 | 47 | 58 | 53 | 55 | 51 |
| Abrasion (ccm) in accordance with DIN 53516 | 97 | 250 | 83 | 114 | 122 | 102 | not found |

Besides the improved processing performance of the unvulcanised rubber mixtures, which is manifested in the low Mooney viscosity, the vulcanisation properties in use of the surface-modified fillers according to the invention show considerable advantages in the dynamic hysteresis at 70° C., which from experience correlates with a low rolling resistance in automobile tires.

If the sulfur reaction of the silica treated with an unsaturated compound containing hydroxyl groups is omitted (Example 8B), no reinforcing effect of the filler can be ascertained.

EXAMPLE 9

The following rubber mixtures were prepared at 150° C. in a 1.5 l kneader. Sulfur and accelerators were finally added thereto on a roll at 50° C.

|  | Comparison Example H | According to the invention J |
|---|---|---|
| Solution SBR rubber BUNA VSL 5025-1 (Bayer AG) | 96 | 96 |
| BR rubber Buna CB 24 (Bayer AG) | 30 | 30 |
| Precipitated silica Vulkasil S (Bayer AG) | 80 | 0 |
| Bis(triethoxysilylpropyl) tetrasulfide (Si 69, Degussa) | 6.5 | 0 |
| Silica as in Example 6 | 0 | 88 |
| Carbon black N 339 (Degussa) | 6.5 | 6.5 |
| Stearic acid | 1 | 1 |
| Aromatic plasticiser | 8 | 8 |
| Zinc oxide | 2.5 | 2.5 |
| Antiozonant wax Antilux 654 (Rhein Chemie) | 1.5 | 1.5 |
| Antioxidant Vulkanox 4020 (Bayer AG) | 1 | 1 |
| Antioxidant Vulkanox HS (Bayer AG) | 1 | 1 |
| Sulfur | 1.5 | 1.5 |
| Accelerator Vulkacit CZ (Bayer AG) | 1.5 | 1.5 |
| Accelerator Vulkacit D (Bayer AG) | 2 | 2 |
| Viscosity of mixture ML 1 + 4 (100° C.) | 91 | 70 |

-continued

|  | Comparison Example H | According to the invention J |
|---|---|---|
| Vulcanisation characteristics in the Monsanto rheometer at 160° C. | | |
| ts 01 (min.) | 0.43 | 0.89 |
| t 90 (min.) | 16.3 | 14.8 |
| Vulcanisation at 160° C.: | 35 | 30 min |
| Tensile stress at 100% elongation (MPa) | 3.0 | 4.2 |
| Tensile stress at 300% elongation (MPa) | 13.6 | 12.5 |
| Strain at break (%) | 370 | 313 |
| Hardness at 23° C. (Shore A) | 72 | 73 |
| Rebound elasticity at 23° C. (%) | 27 | 30 |
| Rebound elasticity at 70° C. (%) | 50 | 60 |
| Abrasion (mm³) in accordance with DIN 53 516 | 75 | 95 |
| tan delta at 0° C. (Roelig) | 0.407 | 0.457 |
| tan delta at 60° C. (Roelig) | 0.151 | 0.077 |

What is claimed is:

1. Surface-treated oxide or siliceous fillers, prepared by esterification of an oxide or siliceous filler with from 0.1 to 50 parts by weight of an unsaturated compound containing hydroxyl groups and treatment with from 0.1 to 50 parts by weight sulfur or sulfur donor, each based on 100 parts by weight of filler used, the reactions being carried out either in succession or together.

2. Surface-treated oxide or siliceous fillers, characterised in that the esterification of the unsaturated compounds containing hydroxyl groups with the oxide or siliceous fillers is carried out at room temperature up to the decomposition temperature of the compounds containing hydroxyl groups and the temperature of the treatment with the sulfur or sulfur donor is from room temperature up to 250° C.

3. Surface-treated oxide or siliceous fillers according to claim 1, characterised in that the reactions with sulfur or with sulfur donors and the reaction with organic compounds containing hydroxyl groups is carried out in a vacuum or at pressures of from 1 to 100 atm.

4. Surface-treated oxide or siliceous fillers according to claim 1, characterised in that they exhibit values for the wettability by methanol of 0 to 55%.

5. Surface-treated oxide or siliceous fillers according to claim 1, characterised in that they contain, in free or chemically bound form, other vulcanisation assistants and filler activators in quantities of from 0 to 50 parts by weight, based on the filler used in each case.

6. A process for producing surface-treated oxide or siliceous fillers, prepared by esterification of an oxide or siliceous filler with from 0.1 to 50 parts by weight of an unsaturated compound containing hydroxyl groups and treatment with from 0.1 to 50 parts by weight sulfur or sulfur donor, each based on 100 parts by weight of filler used, the reactions being carried out either in succession or together.

7. Rubber vulcanizates comprising surface-treated oxide or siliceous fillers, prepared by esterification of an oxide or siliceous filler with from 0.1 to 50 parts by weight of an unsaturated compound containing hydroxyl groups and treatment with from 0.1 to 50 parts by weight sulfur or sulfur donor, each based on 100 parts by weight of filler used, the reactions being carried out either in succession or together.

8. A process for the production of tires comprising surface-treated oxide or siliceous fillers, prepared by esterification of an oxide or siliceous filler with from 0.1 to 50 parts by weight of an unsaturated compound containing hydroxyl groups and treatment with from 0.1 to 50 parts by weight sulfur or sulfur donor, each based on 100 parts by weight of filler used, the reactions being carried out either in succession or together.

* * * * *